(12) United States Patent
Indukuri et al.

(10) Patent No.: US 11,263,342 B2
(45) Date of Patent: Mar. 1, 2022

(54) CONTEXT-BASED ACCESS CONTROL AND REVOCATION FOR DATA GOVERNANCE AND LOSS MITIGATION

(71) Applicant: Ohio State Innovation Foundation, Columbus, OH (US)

(72) Inventors: Harihara Varma Indukuri, Chicago, IL (US); Can Emre Koksal, New Albany, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 410 days.

(21) Appl. No.: 16/289,059

(22) Filed: Feb. 28, 2019

(65) Prior Publication Data

US 2019/0266347 A1 Aug. 29, 2019

Related U.S. Application Data

(60) Provisional application No. 62/636,345, filed on Feb. 28, 2018.

(51) Int. Cl.

| G06F 21/62 | (2013.01) |
| H04L 9/08 | (2006.01) |
| G06F 21/35 | (2013.01) |
| H04L 29/06 | (2006.01) |
| H04W 12/30 | (2021.01) |

(52) U.S. Cl.
CPC .......... *G06F 21/6245* (2013.01); *G06F 21/35* (2013.01); *H04L 9/088* (2013.01); *H04L 9/0819* (2013.01); *H04L 9/0891* (2013.01); *H04L 63/0853* (2013.01); *H04W 12/30* (2021.01); *H04L 2463/082* (2013.01)

(58) Field of Classification Search
CPC .................................................. G06F 21/6245
See application file for complete search history.

(56) References Cited

U.S. PATENT DOCUMENTS

| 7,617,542 | B2 | 11/2009 | Vataja | |
| 9,277,500 | B1 * | 3/2016 | Solsona-Palomar | ........................ H04W 52/0229 |
| 9,326,134 | B2 | 4/2016 | Ahuja et al. | |
| 9,349,016 | B1 | 5/2016 | Brisebois et al. | |
| 10,305,906 | B1 * | 5/2019 | Norum | .................. H04L 9/0897 |
| 11,038,687 | B2 * | 6/2021 | Jones | ...................... H04W 4/02 |
| 2002/0004785 | A1 * | 1/2002 | Schull | ................ G06Q 20/3676 705/51 |

(Continued)

*Primary Examiner* — Simon P Kanaan
(74) *Attorney, Agent, or Firm* — Wood Herron & Evans LLP

(57) ABSTRACT

Systems, methods, and computer program products for controlling use of sensitive data. A heartbeat signal conveying a context identifier is transmitted into areas where access to sensitive data is granted to authorized users. In response to receiving a request to access the sensitive data, access may be granted if the context identifier in the request matches the context identifier in the heartbeat and denied otherwise. If the requestor has exceeded an access threshold, access may be granted at a reduced rate. This reduced rate may be achieved by reducing a rate at which encryption keys are provided to the requestor. An access control layer positioned between an application layer and a communication layer allows the application layer to use plaintext of the sensitive data while protecting the sensitive data as ciphertext in the communication layer.

18 Claims, 8 Drawing Sheets

(56) References Cited

U.S. PATENT DOCUMENTS

| | | | |
|---|---|---|---|
| 2007/0297609 A1* | 12/2007 | Adams | H04L 67/14 |
| | | | 380/270 |
| 2008/0083036 A1 | 4/2008 | Ozzie et al. | |
| 2008/0107274 A1 | 5/2008 | Worthy | |
| 2014/0096215 A1 | 4/2014 | Hessler | |
| 2017/0364422 A1* | 12/2017 | Antony | G06F 11/203 |
| 2020/0034528 A1* | 1/2020 | Yang | H04L 9/0897 |

* cited by examiner

CONTEXT-BASED ACCESS CONTROL AND REVOCATION FOR DATA GOVERNANCE AND LOSS MITIGATION

This application claims the benefit of U.S. Application No. 62/636,345 filed on Feb. 28, 2018 and entitled "Context-Based Access Control and Revocation for Data Governance and Loss Mitigation", the disclosure of which is incorporated by reference herein in its entirety.

BACKGROUND

This invention generally relates to data security and, in particular, to methods, systems, and computer program products for controlling use of sensitive data.

Modern businesses produce and consume large amounts of data. In the current technological environment, the value of many businesses is dictated largely by the data they produce or to which they have access. For many industries, such as law, finance, and healthcare, a large amount of the data they use is inherently sensitive. Examples of this type of sensitive data include data relating to Mergers and Acquisitions (M&A), patient records, company secrets, and Personally Identifiable Information (PII). Certain types of data must also be protected by law. However, to fully obtain the value of sensitive data, enterprises must allow employees and other selected persons access to the data. Thus, enterprises are obliged to keep certain types of data secure while simultaneously providing some level of access to the data.

Unfortunately, data breaches are becoming an all too common occurrence. These breaches can be quite large. For example, on Sep. 7, 2017, Equifax announced a cybercrime identity theft event that is believed to have impacted approximately 145.5 million U.S. consumers. As another example, in October of 2017, the National Security Agency (NSA) is reported to have suffered a major data loss due to an employee storing classified information in a computer at home. Potential human errors put a great burden on Information Technology (IT) personnel, who must constantly scan machines for sensitive data. While scanning for structured data such as social security numbers is a relatively straight forward, if time consuming, process, scanning for project-specific data is often nearly impossible.

Conventional systems approach the problem of data security as an instance of authentication. Under this paradigm, access to sensitive data is provided based on a request that satisfies one or more conditions required for access at the time the request is made. One problem with this type of authentication is that it grants ownership of the data to the user, not just the right to use the data. Enterprises often attempt to compensate for this failing by trying to control access to data after it has been granted based on rules for using data. These rules may include, for example, rules requiring the user to use only sensitive data that is stored in a secure server or on the cloud, prohibiting the user from saving sensitive data locally on a user device, prohibiting the user from attaching sensitive files to emails or other communications, prohibiting the user from opening attachments, or requiring the user to work only with the files when the user is on company premises. By relying on rules of use, the enterprise must trust users to keep sensitive data secure by following the rules or track user actions via data loss prevention tools. However, any data security paradigm that relies on users following rules is only as effective as its users, and thus cannot be guaranteed to work effectively.

In the above user-dependent security paradigm, when data goes outside protection boundaries, or is "exfiltrated", the data is deemed lost. Data losses can have major consequences. Enterprises may need to open investigations to understand the nature of the loss, who is affected by the loss, and who has access to the data. In addition to generating substantial reporting overhead, the fines associated with data breaches can add up to a large fraction of company revenue. In addition, failure to adequately protect against data losses may open the door for lawsuits even without a known data breach. Thus, security measures may be necessary to protect against lawsuits or fines whether or not a data breach has actually occurred.

One reason behind the inability of conventional paradigms to prevent data breaches is a philosophy that all breaches must be prevented at all times. Towards this end, existing approaches are often geared towards building the strongest wall possible around data. As the wall gets stronger, the usability of computer systems normally suffers as there is typically a tradeoff between usability, performance, and security. This lack of usability or performance may in turn provide an incentive for legitimate users to violate the rules of use, e.g., by storing data locally. Another issue is that, once the legitimate users are authenticated, they are not only granted the right to use the data, but are also granted ownership of the data. That is, they can copy the data at will. This means enterprises rely on humans to keep data safe once the users have access. However, human trust is a flawed foundation on which to base data security as humans frequently make mistakes that lead to data breaches. In some cases, authorized data users may be malevolent, and purposely provide data to unauthorized persons.

Thus, there is a need for improved systems, methods, and computer program products for controlling access to sensitive data in computer systems.

SUMMARY

In an embodiment of the invention, a method of protecting data is provided. The method includes transmitting a heartbeat signal that conveys a context identifier used to define an access context, and receiving a request that includes a context identifier from a user device. In response to the context identifier in the request matching the context identifier conveyed by the heartbeat signal, the method unlocks encrypted data at the user device, and in response to the context identifier in the request not matching the context identifier conveyed by the heartbeat signal, the method does not unlock the encrypted data.

In an aspect of the invention, the method may unlock the encrypted data by transmitting an encryption key to the user device.

In another aspect of the invention, the method may further include using the encryption key to generate plaintext from the encrypted data, storing a least a portion of the plaintext in a memory of the user device, and in response to the user device failing to receive the heartbeat signal, removing the encryption key and the plaintext generated using the encryption key from the memory of the user device.

In another aspect of the invention, the request may be a key-unlock request, and the encryption key may be a context key for unlocking an encrypted data key.

In another aspect of the invention, the user device may use the context key to unlock the encrypted data key, and use the data key to unlock the data.

In another aspect of the invention, the encrypted data key may be stored in metadata of the protected data, and the protected data may be encrypted by the data key.

In another aspect of the invention, the method may allow the encrypted data to remain locked by withholding the encryption key from the user device.

In another aspect of the invention, the method may further include using the encryption key to generate plaintext from the encrypted data, modifying the plaintext using an application on the user device, and encrypting the modified plaintext using the encryption key.

In another aspect of the invention, the method may further include determining if the user device transmitting the request has exceeded an access control criteria threshold, and in response to the access control criteria threshold being exceeded, reducing a rate at which encryption keys are provided to the user device.

In another aspect of the invention, the rate at which encryption keys are provided to the user device may be controlled by at least one of one or more service curves, a leaky bucket algorithm, or by delaying transmission of a response to the request.

In another aspect of the invention, the access control criteria threshold may be an amount of encrypted data, a number of encrypted files, or a transmission rate quota.

In another aspect of the invention, the heartbeat signal may be transmitted from a wireless unit, and the heartbeat signal may be received only by the user device if the user device is in proximity to the wireless unit.

In another aspect of the invention, the wireless unit may be a wireless router, an Internet of Things device, or a smart phone.

In another aspect of the invention, the request may include the encrypted data, and the method may further include transmitting plaintext of the encrypted data to the user device in a response to the request.

In another embodiment of the invention, a system for protecting data is provided. The system includes one or more processors, and a memory coupled to the one or more processors that contains program code. When executed by at least one of the one or more processors, the program code causes the system to transmit the heartbeat signal conveying the context identifier used to define the access context, and receive the request including the context identifier from the user device. In response to the context identifier in the request matching the context identifier conveyed by the heartbeat signal, the program code further causes the system to unlock the encrypted data at the user device, and in response to the context identifier in the request not matching the context identifier conveyed by the heartbeat signal, not unlock the encrypted data.

In another aspect of the invention, the system may unlock the encrypted data by transmitting the encryption key to the user device.

In another aspect of the invention, the program code may further cause the system to use the encryption key to generate plaintext from the encrypted data, store the plaintext in the user device, and in response to the user device failing to receive the heartbeat signal, remove the encryption key and the plaintext generated using the encryption key from the user device.

In another aspect of the invention, the program code may further cause the system to determine if the user device transmitting the request has exceeded the access control criteria threshold, and in response to the access control criteria threshold being exceeded, reduce the rate at which encryption keys are provided to the user device.

In another embodiment of the invention, a computer program product for securing data is provided. The computer program product includes a non-transitory computer readable storage medium containing program code that, when executed by one or more processors, causes the one or more processors to transmit the heartbeat signal that conveys the context identifier used to define the access context, and receive the request including the context identifier from the user device. In response to the context identifier in the request matching the context identifier conveyed by the heartbeat signal, the program code further causes the one or more processors to unlock the encrypted data at the user device, and in response to the context identifier in the request not matching the context identifier conveyed by the heartbeat signal, not unlock the encrypted data.

The above summary presents a simplified overview of some embodiments of the invention to provide a basic understanding of certain aspects of the invention discussed herein. The summary is not intended to provide an extensive overview of the invention, nor is it intended to identify any key or critical elements, or delineate the scope of the invention. The sole purpose of the summary is merely to present some concepts in a simplified form as an introduction to the detailed description presented below.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

DETAILED DESCRIPTION

Figure 1:
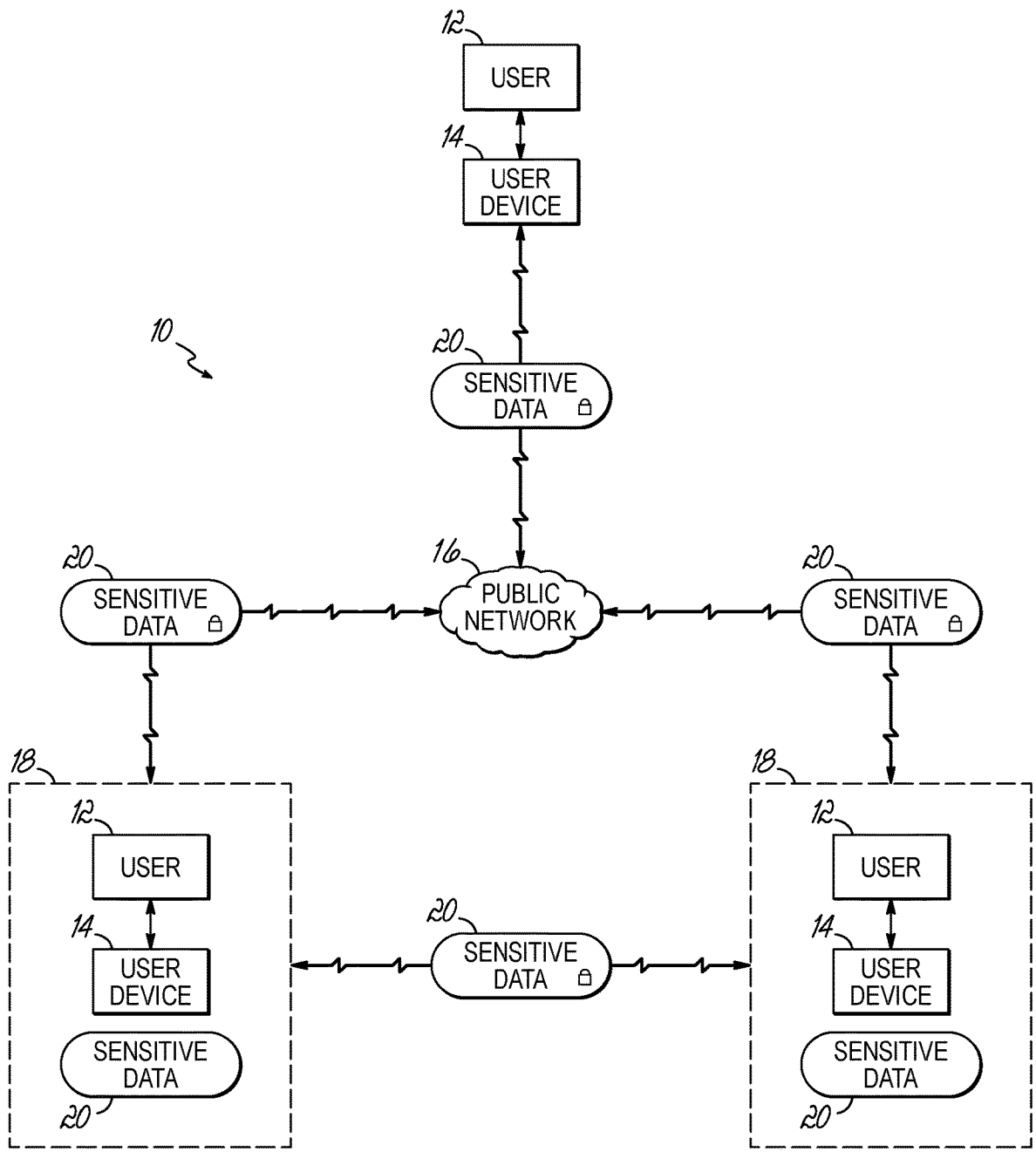
FIG. 1 is a diagrammatic view of an exemplary operating environment including a plurality of user devices accessing sensitive data.

Embodiments of the invention may both prevent data breaches and mitigate data breaches if they occur. To this end, a data anchor system may be configured to accept minor data losses in order to avoid major breaches by using a novel crypto-technology that "anchors" data access within defined boundaries, thereby serving as a backstop against data breaches. By anchoring data access within certain boundaries, the data anchor system may also anchor an attacker within the defined boundaries for an extended amount of time, thus rendering the attacker vulnerable to detection. Further, the data anchor system can revoke access to data even after the attacker has downloaded the data. At the same time, the data anchor system is transparent to legitimate users, so that legitimate users do not notice they are interacting with the data anchor system. The data anchor system also enables high-granularity (i.e., high resolution in both location and time) monitoring of user activity.

To understand the anchoring feature, it may be helpful to analogize the prevention of security breaches in a computer system to the prevention of accidents in a transportation system. To prevent all accidents and associated losses, highways would need to be built with an excessive number of lanes and at the same time to allow only a small fraction of the total number of vehicles on the road at the same time. To prevent property losses, the cars would need to be built with very heavy frames, greatly reducing their efficiency and increasing their cost. This is the philosophy by which conventional cybersecurity systems that strive to prevent all data loss are designed today.

Rather than setting an objective of preventing all accidents, consider an approach which accepts that a certain number of accidents are inevitable. With this approach, components such as the airbags, collision dampers, etc. can be built to mitigate the impact of any accidents that do occur. The philosophy behind the anchoring feature parallels this approach by accepting that some data breaches may be inevitable, and mitigating data loss if a data breach occurs.

Advantageously, the data anchor system may enable users to use sensitive data directly on their user devices by providing cloud-grade security at the user device. The data anchor system is synergistic, and integrates seamlessly with software agents (e.g., web-based or local email), cloud-based file hosting services (e.g., DROPBOX, available from Dropbox, Inc. of San Francisco, Calif.; EGNYTE, available from Egnyte of Mountain View, Calif.; or BOX available from Box, Inc. of Redwood City, Calif.), or document management systems (e.g., IMANAGE, available from Afinety, Inc. of Encino, Calif.; NETDOCUMENTS, available from NetDocuments of Orem, Utah). The data anchor system complements rather than replaces cloud-based security solutions, and provides cloud-based levels of data security for sensitive data used by user applications, such as ACROBAT, available from Adobe Inc. of San Jose Calif., MICROSOFT OFFICE available from Microsoft Corporation of Redmond Calif., or any other suitable user application. This increased level of security may be applied to a specified portion of, or globally to all documents in a group of documents related to a specific service, system, or application. For example, the owner of the sensitive data can choose to protect an entire Dropbox Sync directory, or just selected documents in the directory.

FIG. 1 depicts an exemplary operating environment 10 for the data anchor system including a plurality of users 12 each interacting with a user device 14, and a public network 16, such as the Internet. The user device 14 may be a desktop computer, or a mobile device such as a tablet computer, laptop computer, smart phone, or any other suitable computing device. An enterprise may define one or more boundaries 18 within which one or more of the users 12 can access sensitive data 20 and outside of which the users 12 cannot access sensitive data 20. The boundaries 18 may be defined by an access context including a combination of logical rules and physical constraints. Exemplary logical rules may include requiring user credentials (e.g., username and password) to access the sensitive data 20, or may allow only the sensitive data 20 to be accessed by certain users 12 (e.g., persons in human resources) or user devices 14 (e.g., company issued devices). Physical constraints may include, for example, a requirement that the user be connected to specific Local Area Network (LAN), a requirement that the user device 14 be in a certain geographic area, or that the user device 14 accessing the data is receiving a predetermined signal, e.g., from a mobile application or another service. The data anchor system may thereby provide enterprises with the freedom to define boundaries 18 and control access to sensitive data 20 in a granular fashion.

Regardless of how a boundary 18 is defined, the data anchor system may prevent encryption keys from being accessed by the user device 14 unless the use satisfies the access context defining the boundary 18, and revoke access whenever the boundary 18 is violated, even if the violation is discovered after the fact. Sensitive data 20 in the form of unencrypted data (i.e., "plaintext") is thereby prevented from going beyond the boundary 18 regardless of the transport mechanism used, e.g., whether the data crosses the boundary as an attachment to an email, as a file stored using a cloud-based storage service, or on a memory stick. The data anchor system seamlessly reverts to encrypted data (i.e., "ciphertext") when the boundary is violated, and converts the ciphertext into plaintext when the boundary is satisfied. Enterprises can thus maintain control their sensitive data 20 by maintaining control of the corresponding encryption keys. This control provides the enterprise with true ownership of their sensitive data 20.

The data anchor system can be used to solve many of the problems associated with security issues commonly encountered by enterprises. For example, the data anchor system may be used to remove resistance points in data sharing, thereby facilitating the free exchange of sensitive data without sacrificing security. This may be accomplished, for example, by creating secure gateways between different branches of the enterprise or between the enterprise and trusted external entities such as partners or customers. Because security travels with the data, the data anchor system operates transparently with different data sharing platforms, thereby enabling the enterprise to use whichever data sharing platform is preferred by each user.

Another advantage of the data anchor system is that it can be used to prevent theft of sensitive data by insiders, which can be one of the most difficult security threats to counter. For example, with conventional systems, if a disgruntled employee downloads a customer database or company secrets before leaving a company, the enterprise will have lost control of the data. However, because the data anchor system allows access to sensitive data only while inside the defined boundary, even after the sensitive data has been stored locally, the problem of insider theft is addressed without the need for manual processes or involvement of the IT department.

Further advantages of the data anchor system include facilitation of monitoring, auditing, and compliance functions by enabling any piece of sensitive data to be tracked and monitored in a highly granular fashion. At any given point in time, the enterprise can view when, where, and by whom the sensitive data is being accessed. Further, the IT department can analyze global access patterns and run data analytics through a cloud-based interface, thereby reducing both the cost of compliance and reporting overhead.

The data anchor system may be implemented as a cloud-based solution that enables secure use of sensitive data directly on the user device 14. The data anchor system may also provide a lightweight software agent to user devices 14 that operates with any type of sensitive data and any application that uses the data. The data anchor system allows enterprises to continue to use "whitelist" or "blacklist" applications for sensitive data consumption. The data anchor system may also include a mobile application that facilitates viewing sensitive data on the fly, as well as providing access control and monitoring capabilities. Data access rules and encryption keys can be managed over the cloud, and rules around strong encryption and key management may be fully automated. Unlike conventional instance of authentication type security paradigms, which require manual processes, the data anchor system enables automated data governance.

Figure 2:
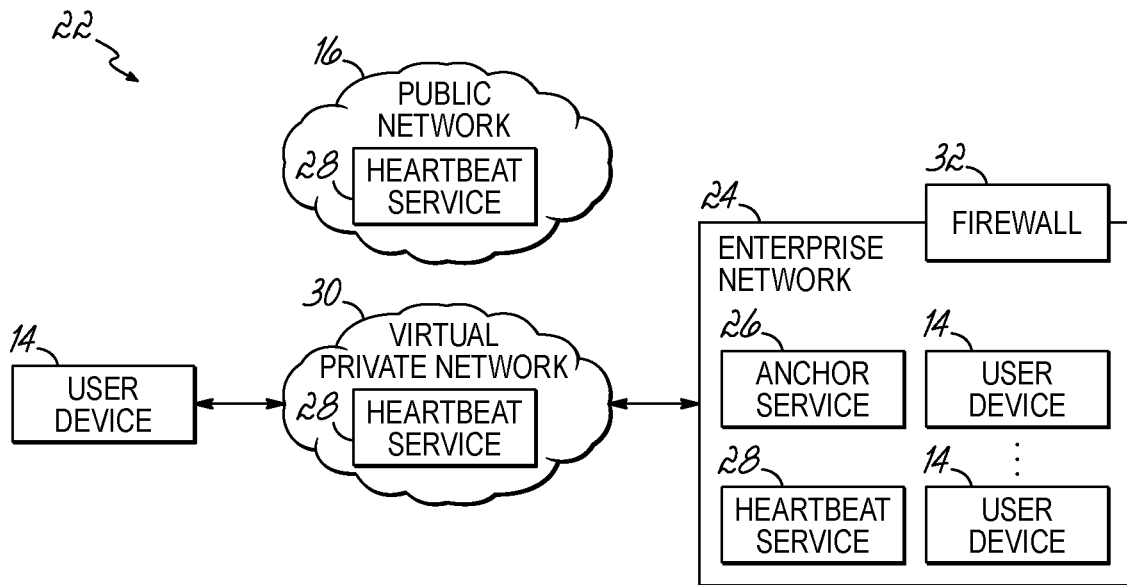
FIG. 2 is a diagrammatic view of another operating environment including the user devices of FIG. 1 and multiple instances of a heartbeat service.

FIG. 2 depicts an exemplary operating environment 22 in which the data anchor system is integrated into an enterprise network 24. The data anchor system includes an anchor service 26, which may reside inside the enterprise network 24, and a heartbeat service 28, which may reside in one or more places inside or outside of the enterprise network 24. Each heartbeat service 28 may be configured to define the access context at a variety of spatial or network resolutions that define a physical or virtual location, respectively. The access context can be further constrained by the role and the credentials of a user. Further filters can be added to define the access context at a higher resolution as it pertains to a variety of situations.

The heartbeat service 28 may be provided as a network-based service in the public network 16 or Virtual Private Network (VPN) 30, or by an application or module operating within the enterprise network 24. The data anchor system may be used to augment existing data protection solutions, such as a firewall 32, and may provide a back-stop for errors made by system users 12. The data anchor system may essentially provide a secure gateway for accessing files, whether they are located in the cloud, a database, or other memory location, that adds revocability and physical access control features to existing systems. The data anchor system may thereby enable efficient data governance as compared to conventional data tracking and governance systems, which typically include manual components. Embodiments of the invention may both automate these conventional processes and add strong encryption to sensitive data.

Figure 3:
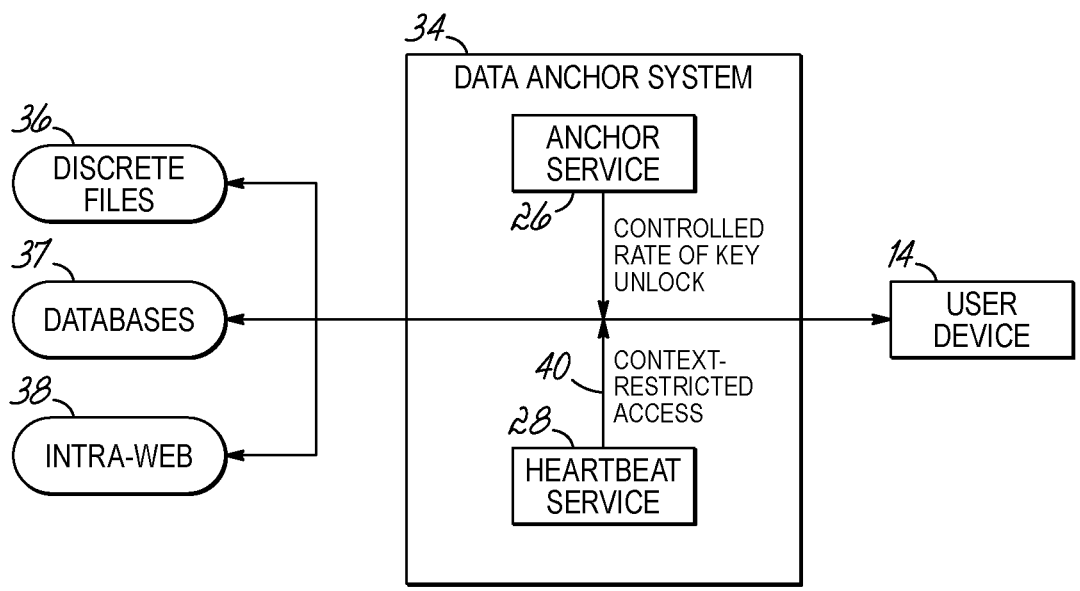
FIG. 3 is a diagrammatic view of a data anchor system including an anchor service and the user device and the heartbeat service of FIG. 2.

FIG. 3 illustrates an exemplary architecture of a data anchor system 34 in accordance with an embodiment of the invention that controls interactions between data and users of the data. The data anchor system 34 may include one or more components that sit between each user device 14 and the sources of data 36-38 being protected. The data anchor system 34 may use a heartbeat signal 40 to verify one or more requirements of the access context. To this end, the heartbeat signal 40 may carry a context identifier that can be used to satisfy a location context requirement. The heartbeat signal 40 may transparently automate the unlocking of encrypted data while restricting data use to defined location contexts by controlling where the context identifier is provided to the user. The context identifier may be changed periodically to ensure that the user device 14 can satisfy the location context requirement only if the user device 14 is currently receiving the heartbeat signal 40.

The anchor service 26 may be provided by an application, software module, hardware module, or other suitable means in a hardened location of the enterprise network 24. The anchor service 26 may be configured to unlock one or more keys to encrypted data so that legitimate users do not experience significant delays or other performance issues which would indicate they are interacting with the data anchor system 34. That is, any performance degradation associated with operation of the data anchor system 34 would typically go unnoticed.

The anchor service 26 may monitor requests for data for suspicious characteristics. If a request for data is determined to be suspicious based on one or more access control criteria (e.g., a request to exfiltrate records from a database exceeds an allowed data volume, file number, number of records, or other access criteria threshold), the anchor service 26 may throttle the flow of encryption keys to the user device 14 so that the request is served over an extremely long duration, e.g., hours or days. Thus, if the attacker waits for all the data to be retrieved, they will need to remain within the boundary 18 (physical or network) where the heartbeat signal 40 is available during this period, e.g., inside the enterprise network 24. Associating the access context with user role and credentials may make unauthorized exfiltration of data more difficult than using either of these methods alone. By anchoring users to a location, the data anchor system 34 renders attackers vulnerable to detection and limits the amount of data they can access before being detected.

The heartbeat service 28 may be provided by an application or module that associates an access context with access to sensitive data. The heartbeat service 28 may generate and periodically transmit the heartbeat signal 40 in order for user devices 14 to confirm that they satisfy the required location context for accessing data. For example, if the heartbeat service 28 is provided using a wireless local area networking protocol, e.g., a protocol based on the IEEE 802.11 (i.e., WiFi), the heartbeat signal 40 may be sent over the wireless interface protocol. In an embodiment of the invention, the heartbeat signal 40 may include a data packet that is forwarded to the anchor service 26 that includes some type of context information. In an alternative embodiment of the invention, the heartbeat signal 40 may provide only an acknowledgement that the user device 14 is in the location context. This may be the case, for example, when the location context is defined by the coverage area of an existing WiFi router.

The access context may include a "location" which, as used herein, may refer to a physical space (e.g., an office) or virtual space (e.g., a network) in which the heartbeat signal 40 is available. In some cases, the access context may be further constrained by the role and the credentials of the user 12. Further filters may also be added to define the access context at a higher resolution as it pertains to a variety of situations. For example, a physical location may be defined as an area covered by a wireless signal (e.g., a signal transmitted by one or more wireless access points, Internet of Things (IoT) devices, mobile devices, wireless routers, or other wireless units) that includes or otherwise provides the heartbeat signal 40. A virtual location may correspond to the VPN 30, a set of network addresses located behind the firewall 32, or a set of network addresses that fall within a subnetwork over which the heartbeat signal is provided. A role may correspond to the user position in the enterprise, such as a developer or a manager.

Files used at an enterprise may be stored in specific locations (e.g., on a server or system database), or distributed across a network (e.g., a cloud storage system). In existing systems, authenticated users 12 may save a protected file in local memory, share the file via email, and make files available through an open link that allows the file to be downloaded over the Internet. In these types of system, an external attacker may capture one or more of the access credentials of a legitimate user 12 or the user device 14, and use the credentials or device to exfiltrate data files. As discussed below, embodiments of the invention can effectively address this issue by enabling dynamic control of sensitive data even after it has been exfiltrated.

Figure 4:
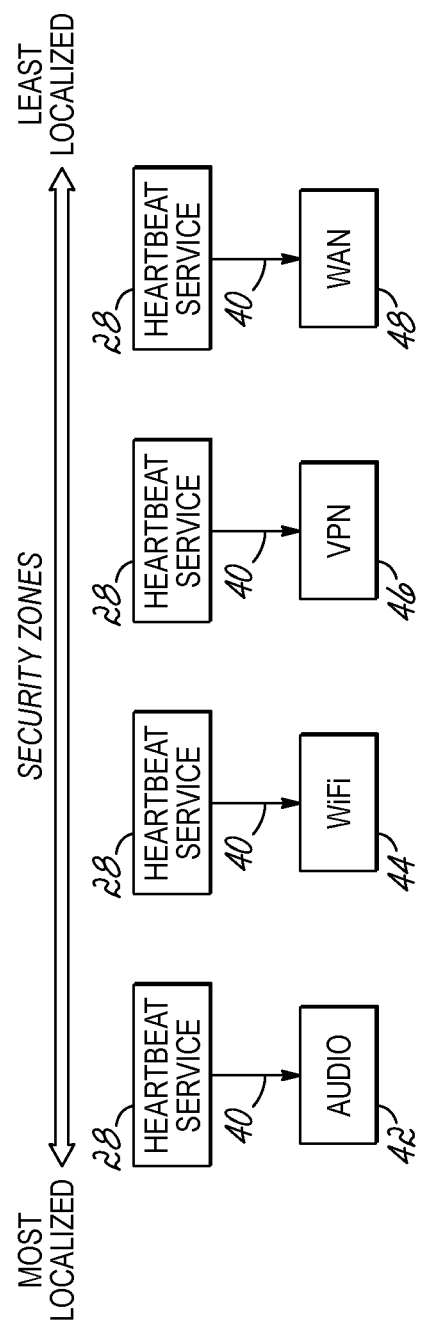
FIG. 4 is a diagrammatic view of a plurality of channels through which a heartbeat signal may be provided to the user device by the heartbeat service of FIG. 3.

Referring now to FIG. 4, the heartbeat signal 40 may be generated by the heartbeat service 28 of data anchor system 34 and transmitted over any suitable channel, e.g., a carrier signal or network. Exemplary channels may include a modulated audio signal 42, WiFi signal 44, VPN 46, or Wide Area Network (WAN) 48. The channel used to provide the heartbeat signal 40 may define an extent of the location context in which sensitive data 20 can be accessed. Thus, the data anchor system 34 may be configured to provide multiple resolutions for location contexts that vary in size from a single office to locations defined by availability of the VPN 46 or WAN 48. Exemplary resolutions may include: (a) access restricted to single room or floor (e.g., for critical data), (b) access restricted to an office (e.g., for business data), (c) access permitted for remote workers/trusted partner firms (e.g., for general data), and (d) access permitted for outside collaborators/clients (e.g., for general data). The access context may also be configured based on user roles and credentials. That is, the access context associated with a file may be combination of location contexts and user role. Different heartbeat signals 40 or context identifiers may be provided at the same time for different types of sensitive data so that each type of sensitive data is confined to its respective location context.

If the heartbeat signal 40 is not detected for a period of time, then access to data may be revoked, even after the data in question has been received by a user device 14. For example, if the context identifier provided by the heartbeat signal 40 is updated (e.g., changed to a new random number), a user device 14 that is not receiving the heartbeat signal 40 may be unable to establish the location context needed to receive encryption keys from the anchor service 26.

In addition to revoking access to encrypted data (i.e., ciphertext) when the heartbeat signal 40 is not detected, any plaintext stored in the device (e.g., in a cache, volatile memory, or non-volatile memory) may be removed. Unlike existing approaches, which provide access contingent upon satisfying certain rules, the data anchor system 34 can remove access to sensitive data 20 if the security rules are broken at any point in time. Unlike conventional systems that make determinations regarding access to sensitive data at the instance of authentication, the data anchor system 34 dynamically combines rule-based access and revocation across time. This dynamic rule-based access to the sensitive data itself is in contrast to conventional multifactor access technologies, which are concerned only with providing access to the rule rather than switching between access and no access.

Without encryption keys, the user device 14 may lose the ability to unlock ciphertext whether that data is stored locally or received from the network. Advantageously, this feature of the data anchor system 34 may prevent loss of data even if user access credentials are compromised, e.g., the user leaves their laptop computer in the back of a taxi.

In an embodiment of the invention, if the heartbeat signal 40 is not decoded by the user device 14, certain data stored in memory or otherwise accessible by the user device 14 may be deleted. For example, plaintext stored in a cache, volatile, or non-volatile memory of the user device 14. By deleting local unencrypted copies of sensitive data in the absence of the heartbeat signal 40, embodiments of the invention enable elimination of access to sensitive data if the access context is violated at any point in time, e.g., if the heartbeat signal 40 is lost. This feature provides a dynamic second factor that gives the data anchor system 34 advantages over conventional systems, which simply provide access contingent upon satisfying certain rules at a specific point in time. This combination of rule-based access and dynamic revocation of access provided by the data anchor system 34 provides additional flexibility as compared to conventional multifactor access technologies, which are binary in nature, i.e., concerned only with providing access based on whether rules are satisfied at a single point in time rather than switching between access and no access dynamically in time.

Features provided by the data anchor system 34 from which an enterprise can benefit may include the ability to secure all types of data, including data files located in a cloud or local memory, and data stored in a database. A data file, as used herein, may refer to a unit of data that is encapsulated independently as a block, and may include an extension depicting the file type (e.g., txt, jpeg, etc.). In contrast, data may include information or items of data that are independent of or embedded in a data file, such as a social security number, a credit score, etc.

An advantageous feature of the data anchor system 34 is the ability to revoke ownership of protected files even after a breach, e.g., by withholding encryption keys. The data anchor system 34 may also provide system administrators with the ability to limit the use of data within specified access contexts, e.g., only when the user device 14 satisfies a location context associated with the data or also restrict the user based on the role they hold in the enterprise. Access to sensitive data may be confined within the network and the flow of data controlled in a way that forces an attacker to remain within the network boundaries for a substantial amount of time, rendering the attacker vulnerable to detection.

For example, detection of a Media Access Control (MAC) address of a user device 14 reported as missing could alert the data anchor system 34 to a possible attack, and even facilitate recovery of the user device 14. The data anchor system 34 may also enable granular monitoring of data use by maintaining logs of what items of data were accessed, when they were accessed, and the location from where they were accessed. These logs may then be used to audit data security. Yet another advantage of the data anchor system 34 is that it may work in conjunction with existing security solutions to augment security by acting as a backstop for human errors.

In an embodiment of the invention, the anchor service 26 may be integrated with one or more heartbeat services 28. A service curve defining an allowed data transmission rate or quota for each user 12 or user device 14 may be selected by the anchor service 26 by defining an excess heartbeat count for a given point in time beyond which the service is reduced. To this end, the anchor service 26 may keep track of the number of heartbeats accumulated by the user device 14 in question and adjust the available data quota or allowed throughput downward if this number exceeds a threshold.

An exemplary rate controller for this situation may be based on a leaky bucket algorithm. In one application of the leaky bucket algorithm, an authenticated user 12 may start with a bucket of b tokens that accumulates additional tokens at rate of a tokens per unit of time $\Delta t$ (e.g., a tokens per second). For each predefined amount of data accessed (e.g., m bits), the number of tokens may be reduced, e.g., by one token. The amount of data downloaded by an authenticated user 12 may be limited so that it does not cause the number of outstanding tokens to be less than zero. Thus, by time t, in the present example, the amount of data allowed to be downloaded by the user 12 would remain below a×t+b.

In an embodiment of the invention, the value of b may be chosen so that more than a specified portion (e.g., 95%) of legitimate requests fall below that threshold. Requests falling below the threshold would incur essentially no extra delay due to operation of the data anchor system 34. The value of a may then be chosen such that a significant portion of all suspicious requests (e.g., 100%) take an extended amount of time to complete, with the extended amount of time being sufficient to reduce the impact of the data breach. The values of the portions of legitimate requests that fall below and suspicious requests that exceed the threshold may be defined, for example, by a system administrator based on a desired level of service or data security.

By way of a numerical example, if b is 1 GB and a is 100 kB/sec, then any request that requires processing of data <1 GB will not incur any extra time above the normal download time. However, if a request requires processing 50 GB of data to download, the download would take about six days to complete. The data anchor system 34 may thereby allow the service curves to be engineered depending on the application. Thus, by careful integration of the anchor service 26 and heartbeat services 28, the data anchor system 34 may be developed as a part of context-based authentication system.

Figure 5:
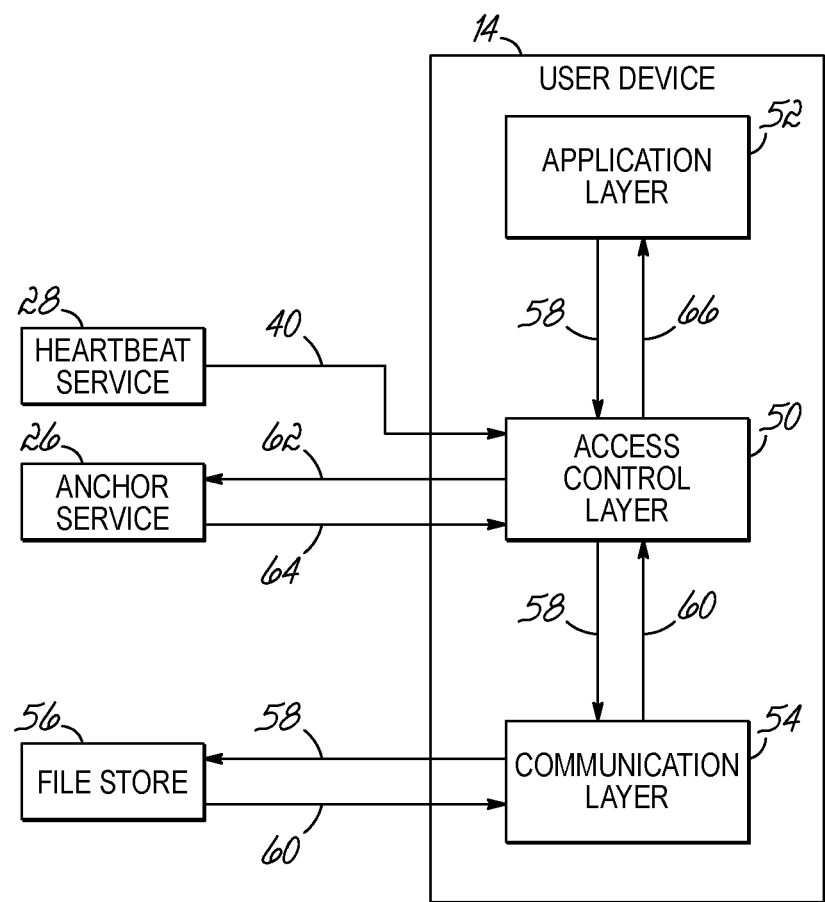
FIG. 5 is a diagrammatic view of the user device of FIGS. 1-3 depicting an access control layer that communicates with the anchor service and heartbeat service to manage a flow of data between an application layer and a communication layer in the user device.

FIG. 5 depicts a system topology in accordance with an embodiment of the invention that may be used to facilitate file sharing. The user device 14 may include an access control layer 50 that regulates the flow of data between an application layer 52 and a communication layer 54. The communication layer 54 may include hardware or software, and may comprise one or more interconnection layers (e.g., presentation, session, transport, network, data link, or physical layers) through which the application layer 52 transmits and retrieves data, e.g., data stored in a local memory of the user device 14 or in an external source of data 36-38. The access control layer 50 may be provided by a data protection module or agent residing on the user device 14 that manages the flow of data between the application layer 52 and the communication layer 54.

For example, the access control layer 50 may be provided by an agent implemented in software and integrated into the user device 14. Ciphertext received via the communication layer 54 marked as being associated with a required access context may be decrypted in the access control layer 50 and passed on to the application layer 52 as plaintext if the access context is satisfied, e.g., the heartbeat signal 40 is present. The access control layer 50 may be present in each user device 14 to verify that the user device 14 satisfies any required access context before allowing the application layer 52 to access sensitive data via the communication layer 54. The access control layer 50 may enable the plaintext to be modified in the application layer 52 (e.g., in response to the user 12 editing sensitive data 20 using an application running on user device 14) and provide the modified data to the communication layer 54 as ciphertext. The access control layer 50 may thereby enable editing of sensitive data 20 by applications in the user device 14 while keeping communication of sensitive data between applications, users, or user devices as ciphertext.

Sensitive data 20 may reside on a file store 56 comprising a storage system (e.g., a distributed storage system such as Box, Dropbox, Google Drive, or other cloud-based storage system) that contains files in an encrypted form. In the depicted embodiment, neither the data structure at the file store 56 nor the interaction between the file store 56 and the application layer 52 is altered by the presence of the anchor service 26. The heartbeat signal 40 may be configured to consume a low amount of bandwidth, and may be checked periodically (e.g., once every few seconds) by the access control layer 50.

In response to the application layer 52 generating a data request 58, the access control layer 50 may pass the data request 58 on to the communication layer 54, which may forward the data request 58 to the file store 56. In response to receiving the data request 58, the file store 56 may retrieve ciphertext corresponding to the requested data and transmit the ciphertext to the user device 14 in a data response 60. The received ciphertext may then be stored by the user device 14 in a local memory, e.g., a cache or buffer memory.

Before the ciphertext can be decrypted, the access control layer 50 or anchor service 26 may determine if the user device 14 is operating within an access context associated with the file. This determination may be made, for example, by the access control layer 50 extracting the context identifier from the heartbeat signal 40 and transmitting the context identifier to the anchor service 26 in a key-unlock request 62. The anchor service 26 may then determine whether to transmit a data encryption key to the access control layer 50 based at least in part on whether the context identifier indicates the access context associated with the ciphertext is satisfied, e.g., that the user device 14 is in an allowed location context. If the required access context is satisfied, anchor service 26 may transmit a key-unlock response 64 to the access control layer 50. In an embodiment of the invention, the key-unlock request 62 or key-unlock response 64 may include metadata associated with the data to be opened, such as a file identifier, a digital signature associated with the access control layer 50 that is used by the anchor service 26 to verify that the user device 14 is legitimate, or any other suitable data.

How the anchor service 26 responds to the key-unlock request 62 may also depend at least in part on a determination of whether the data access requested by the application layer 52 exceeds an access control criteria threshold, e.g., an allowed amount of encrypted data, number of encrypted files, data transmission rate, or transmission rate quota. If fulfilling the key-unlock request 62 would not cause the access control criteria threshold to be exceeded, the anchor service 26 may respond immediately to the key-unlock request 62. In this case, a key-unlock response 64 may be transmitted using only the time necessary to process the key-unlock request 62, e.g., a few milliseconds, thereby allowing the access control layer 50 to decrypt the ciphertext immediately.

If fulfilling the key-unlock request 62 would cause the access control criteria threshold to be exceeded, the flow of data may need to be throttled. In this case, the service curves used by the anchor service 26 may cause the anchor service 26 to delay sending the key-unlock response 64. The length of the delay may be set so that suspicious requests, such as exfiltration of an entire directory of protected files, are transmitted over a long period of time. This hybrid mechanism may force the attacker to enter the location context to order to retrieve data by sending key-unlock requests 62 to the anchor service 26 for each file. While this may not prevent the loss of some files to an attacker that satisfies all the requirements (i.e., using stolen credentials and satisfying the access context requirements), it may eliminate large-scale breaches in which the attacker goes undetected.

Each protected file may be encrypted using a separate file key. The file keys may be maintained by the anchor service 26 in an encrypted form using a context key. The context key associated with a file key may be available only at the anchor service 26, which as described above, may be separately hardened and inaccessible from outside the location context. Thus, even if the files are captured, it may be impossible to decrypt the file keys outside of the location context. In contrast, conventional systems typically decrypt the files at the file store 56 or at the user device 14 contingent only on the availability of the user credentials (e.g., username and password) for the authorized users. In addition, once the attack is detected, embodiments of the invention may enable revocation of access to lost files by changing the context key. This can be done without affecting the existing users 12 by the anchor service 26 simply changing the context key and encrypting the file keys with the new context key.

File keys may be decrypted by the anchor service 26 once per request. The associated plaintext file key may be transmitted from the anchor service 26 to the user device 14 over a secure connection. The anchor service 26 may enforce a strict per-service rate-limit on the number of allowed decryptions to prevent massive data breaches through the use of stolen user credentials.

In response to receiving the file key in the key-unlock response 64, the access control layer 50 may decrypt the ciphertext contained in the data response 60 and transmit a data response 66 containing plaintext to the application layer 52. If the heartbeat signal 40 stops or is otherwise lost at the user device 14, the access control layer 50 denies the application layer 52 access to the file and destroys the file key. Thus, the heartbeat service 28 acts as an automated revocation mechanism for file access.

In a worst-case scenario, an attacker may capture the contents of the file store 56, the encrypted file keys, and a user device 14 with log-in credentials. In this scenario, even though the attacker has everything an authorized user needs to access the files, the attacker cannot unlock the file keys without sending a key-unlock request 62 to the anchor service 26 for each file that is to be unlocked. However, this process must take place within the location context, e.g., the network itself. Thus, the attacker must remain within the location context for an extended period of time to satisfy the access context requirements and gain access to a large number of files. Further, the data cannot be accessed outside the boundaries of the location context as access is revoked if the heartbeat signal 40 is not present. The data anchor system 34 thereby acts as a crypto-anchor that prevents the attacker from obtaining ownership of any sensitive data, even with a captured user device 14.

Figure 6:
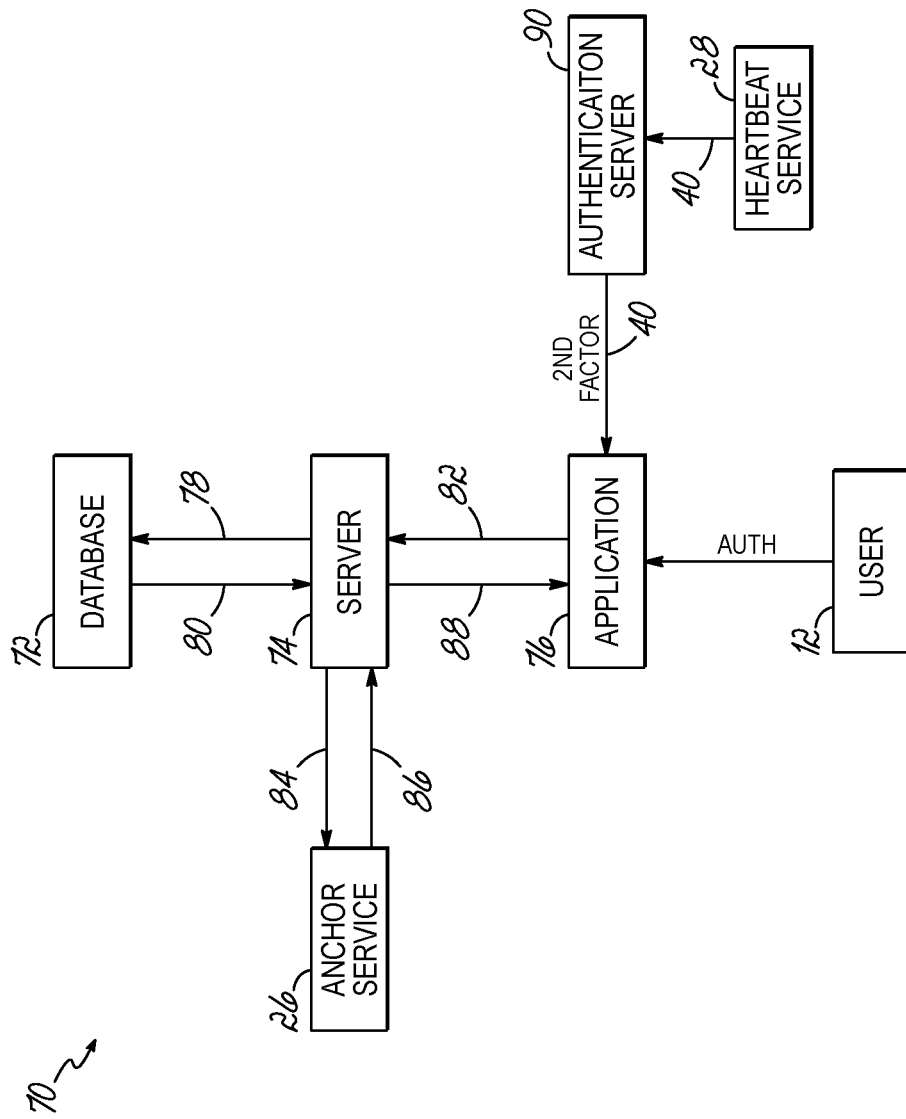
FIG. 6 is a diagrammatic view of a server that queries the anchor service of FIGS. 4 and 5 to obtain a key which may be used to decrypt sensitive data.

FIG. 6 depicts an exemplary operating environment 70 showing operation of an embodiment of the data anchor system 34 when protecting data stored in a database 72. Unlike data files, data contained in databases may be pulled in an on-demand basis. The data anchor system 34 may operate on data stored in the database 72 in a similar fashion as described above with respect to data files. That is, the system may attempt to keep the attacker anchored within a location context for an extended period of time when executing a large-scale attack on the database 72 rather than stopping the attack itself.

In the depicted embodiment, the database 72 may be accessed through a server 74 (e.g., a web-server) in communication with the anchor service 26. A user application 76 (e.g., a web browser) accessing the database 72 through the server 74 may be in communication with the heartbeat service 28. The data anchor system 34 may be integrated with a field-based encrypted database using a well-defined mapping between database queries 78 and the encrypted data in corresponding database responses 80. In response to receiving a query 82 from the user application 76, the server 74 may retrieve the encrypted data from the database 72. Instead of being decrypted at the server 74 or the user device 14, the encrypted data may be transmitted to and decrypted by the anchor service 26 using an associated data key. This data decrypting may be performed separately for each database query 78 sent by the server 74. The anchor service 26 may monitor the database queries 78 sent from the server 74 and throttle the decryption process based on a service curve defined for the server 74. In this way, the anchor service 26 may apply different service curves to different servers.

By way of example, if the server 74 is captured by an attacker (e.g., by exploiting a security opening or using compromised administrator credentials), the attacker may be able to send a request to flush the contents of the database 72 completely. For systems that perform decryption inside the server 74, the attacker could then complete a major breach, obtaining sensitive information for millions of people in the course of a few hours. In this case, by the time the activity is detected, it may be too late. This is essentially how the Equifax attack is believed to have unfolded.

In contrast, with the data anchor system 34, if the attacker sends the same database exfiltration request, the anchor service 26 throttles the decryption process so that the attacker would need to remain within the network for an extended period of time (e.g., months) to download a significant amount of data. Typically, this kind of a breach would be detected before the actual data loss became significant. The data anchor system 34 may thereby stop major breaches by limiting data loss when a breach occurs.

The anchor service 26 may store the data keys used to decrypt data received from the database 72. In response to receiving a message 84 containing the ciphertext from the server 74, the anchor service 26 may decrypt the ciphertext and transmit plaintext back to the server 74 in a message 86 transported over a secure connection. The server 74 may then transmit a response 88 containing the plaintext to the user application 76. The anchor service 26 may thereby control the rate at which decrypted data is provided to the server 74 so that attackers making abnormally large requests for data are required to linger within the network boundaries for extended amounts of time, making them vulnerable for detection.

In a similar fashion as described in the discrete file scenario, the heartbeat signal 40 may act as a dynamic second factor for authentication by providing an access context to the query 82. Once the user is authenticated, the heartbeat signal 40 can be marked as an additional factor in a database authentication server 90 and transmitted to the user application 76 as the second factor. The database authentication server 90 may be configured to cut access to the heartbeat signal 40 unless the heartbeat signal 40 is acknowledged by the user device 14.

In an embodiment of the invention, the anchor service 26 may be integrated into the server 74 as a proxy server that sits between the server application and the database 72. In an alternative embodiment of the invention, the proxy server may reside in the database 72 between an input/output (I/O) interface of the database system and the database 72 itself. In either case, database queries 78 may be filtered by the proxy server as they are communicated to and from the database 72 according to one or more programmed service curves.

In an alternative embodiment, the anchor service 26 may include an agent that is installed in the user device 14 executing the user application 76. Instead of wrapping a file, the anchor service 26 may execute outgoing connection requests for the database 72 from a port associated with the user application 76. The anchor service 26 can thereby tie connection access to the presence of the heartbeat 40. In this embodiment, the data keys to unlock the data received from the database 72 (e.g., column-encrypted database contents) can be handled via the anchor service agent in a manner similar to that described for discrete-file scenario. If the heartbeat is not detected by the agent, then the keys to decrypt the content may be removed immediately.

The heartbeat signal 40 may be provided using a variety of channels or mediums. One way that may be used to provide a highly localized access context is to transmit the heartbeat signal 40 using audio signals. For example, a carrier signal having an ultrasonic frequency may be modulated with the heartbeat signal 40. The modulated carrier may be provided to an audio system and broadcast as an acoustic signal by one or more speakers in the space associated with the access context. The acoustic signal may include a combination of audio intended for the user (e.g., music or announcements in the audible frequency band) and data carried by the ultrasonic modulated signal, e.g., the heartbeat signal 40. Systems, methods, and computer program products for transmitting data using audio signals are described in more detail in U.S. Pub. No. 2018/0262277, filed Mar. 6, 2018 and entitled "Data Delivery Using Acoustic Transmissions", the disclosure of which is incorporated by reference herein in its entirety.

When audio signals are used to transmit the heartbeat, an adaptive frequency mismatch correction unit may be used to decode or otherwise receive the heartbeat signal 40. The adaptive frequency mismatch correction unit may work iteratively over successive demodulations of the received signal via the adjusted frequency and estimation of the mismatch using the updated samples with the corrected mismatch. The iterations may stop when successive estimates are sufficiently close to each other.

Embodiments of the invention may be used by government or private entities having sensitive data which is accessed by people, e.g., any entity with employees, partners, or contractors that use sensitive data from encrypted distributed file repositories or databases. For example, research universities often work with the Department of Defense (DoD) and other government institutions as contractors for research and development. Such projects typically involve the use of sensitive data that is not permitted to be distributed, shared, or even taken out of the locations dedicated for the research. Before the DoD gives access to a university working under a grant, they require the university to submit a technology control plan. Within this plan, the university details how they will comply with a number of items in as specified in the National Institute of Standards and Technology (NIST) Special Publication 800-171, "Protecting Controlled Unclassified Information in Nonfederal Information Systems and Organizations", the disclosure of which is incorporated by reference herein in its entirety. Only after compliance is approved by the DoD may the university begin research under contract. In the near future, this compliance may be required to receive all government funds, including projects funded by National Science Foundation (NSF), National Institute of Health (NIH), etc.

One of the requirements for a technology control plan involves controlling the locations within the campus where sensitive data can be accessed. To become compliant, project personnel need to provide the offices and computer labs within which they keep the data. There are four different levels of sensitive data and every computer used in the project is categorized by the level of sensitivity of the sensitive data, with "red" denoting the highest level of sensitivity.

For example, for The Ohio State University, technology control plans are verified and enforced by the Export Control Office. Compliance goes through each technology control plan to verify that the plan meets the requirements of NIST Special Publication 800-171. This verification process typically takes two to four months. Current requirements for projects that involve "red" level data appear to prohibit the use of any Portable Data Terminals (e.g., mobile computing devices), because, so far, no known plan that includes portable computing devices has been found compliant. Thus, current plans restrict research to use of dedicated machines that cannot leave their designated locations. The responsibility for following this rule is given to the managers of the project and this can open the door to human error or malfeasance.

Currently, there is no existing plan that involves the use of mobile devices which can leave the premises for tactical research projects under the existing compliance requirements. However, the access context feature of the data anchor system allows access to data stored on a portable computing device to be revoked when someone attempts to access the data outside of specified areas. Advantageously, this feature may enable the use of mobile devices when working with sensitive data in government funded projects. More advantageously, because once compliance is given for one project, the same device can be used for other projects, devices using the data anchor system could potentially be used for multiple projects without recertification.

Additional potential users of the data anchor system may be in financial and insurance companies. Unlike research institutions for which the location-context is a specific requirement, financial and insurance companies are typically more interested in breach mitigation and data revocation features. In particular, most enterprises value the flexibility of enabling their personnel to work from a distance while still having access to sensitive data. At the same time, medium to major breaches are a great concern. The perspective of these institutions is generally that people need to view, manipulate, and exchange data, but they do not need to own the data.

When a data breach occurs, financial institutions can be required by law to report the breach. By reducing the amount of data lost during a data breach, the data anchor system may substantially reduce the need for reporting. Indeed, if it is determined that sensitive data has been viewed by an unauthorized party, one parameter often taken into consideration is the time of exposure. With the present invention, use of the heartbeat may allow IT managers to identify the geolocation of the document accessed and the duration of exposure. If the duration is below a certain threshold, it would not be necessary to report the breach because only a few items were viewed and no decrypted data could have been downloaded.

Possibilities for integrating access context may include enforcing in-premise download requirements when a data file is created or downloaded for the first time, or using a narrow access context for user or user device authentication. In this embodiment, access outside of the access context would be allowed only if the access context was verified in the first download. This feature may mitigate direct remote attacks by outsiders.

A common complaint in the financial industry is that the rules on data use are too tight, to the extent that outside emails with attachments are not allowed and individual connections are closely monitored. Once an attack is detected, IT typically enforces a complete network blackout until the damage (e.g., the amount of sensitive data lost) is determined.

Many enterprises work with a large partner network as well as contractors. The data anchor system enables these enterprises to monitor (and potentially control and secure) access to their sensitive data by the contractors. Currently, most enterprises lack such monitoring capabilities and data safety is enforced by the enterprise via agreements and compliance requirements in which breaches are communicated to the enterprises after the fact. In contrast, embodiments of the invention can provide continuous and high-resolution monitoring of vendor activities as they work with the enterprise data.

Figure 7:
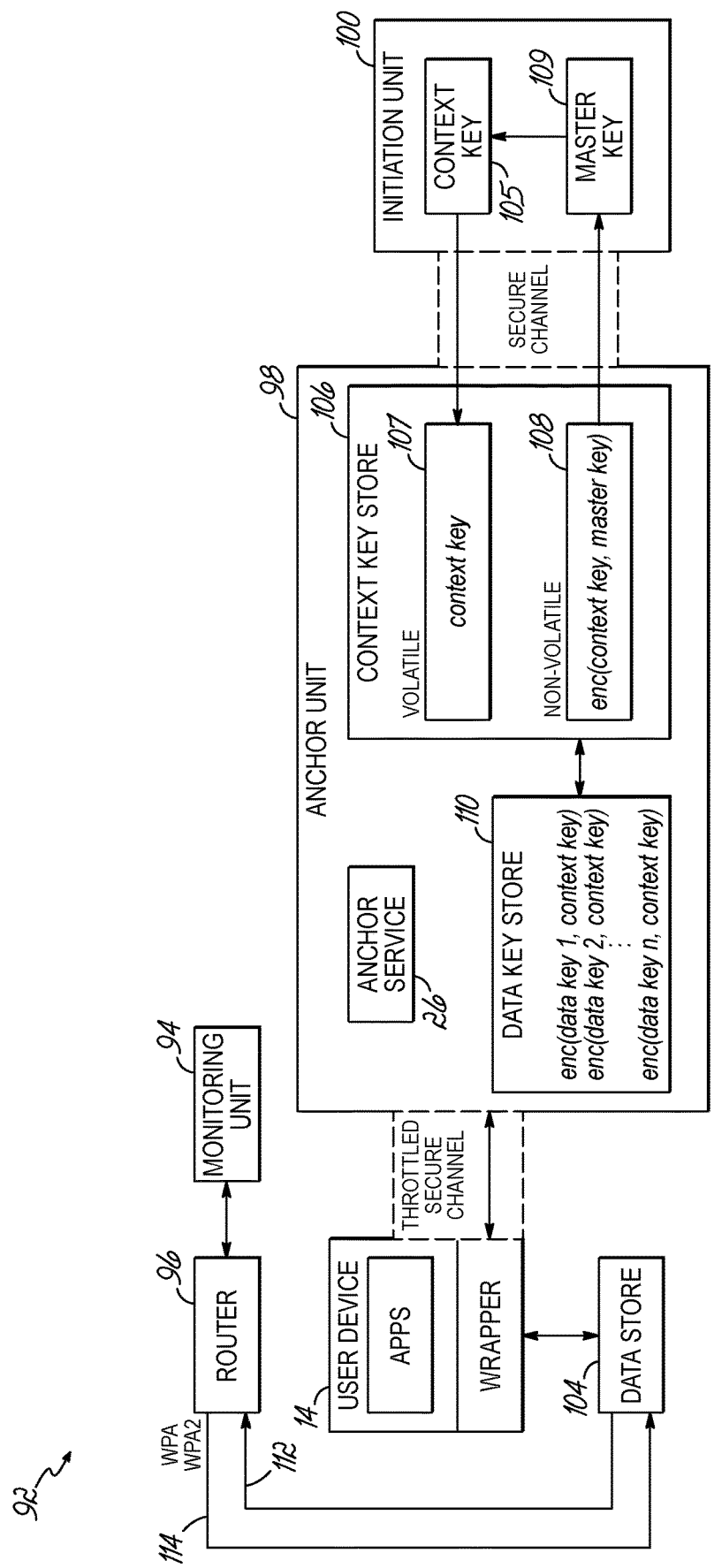
FIG. 7 is a diagrammatic view of an operating environment including a router, monitoring unit, anchor unit, and initiation unit that manage access to the sensitive data of FIG. 1.

FIG. 7 depicts an operating environment 92 in accordance with an embodiment of the invention. The operating environment 92 includes the user device 14, a monitoring unit 94, a router 96 (e.g., a WiFi router), an anchor unit 98, an initiation unit 100, and a data store 104. The depicted operating environment 92 may support interaction between the components with Service Message Block (SMB) encryption and vendor portal use cases. In a lighter use case, the anchor service 26 and the initiation unit 100 may be omitted, in which case access to data may be tied to the heartbeat signal 40 and details of the heartbeat signal 40 constantly transmitted from the user device 14 to the monitoring unit 94. In the light-use case, encryption of data may be handled conventionally, e.g., stored local disk or cloud files are encrypted and decryption enabled with user credentials.

The monitoring unit 94 may be provided by a cloud-based service, a private web server, or any other suitable network or device. The router 96 may provide the heartbeat signal 40 to a portion of the network or a specific area. For example, in the case of wireless WiFi router, the heartbeat signal 40 may be provided to a geographic area covered by the wireless signal. Access context for the heartbeat signal 40 may be limited to a single router, a subnetwork, or may cover an entire LAN.

The anchor unit 98 may include a local proxy server, a local computer, or may be provided as a cloud-based service. The anchor unit 98 may maintain one or more context keys 105 in a context key store 106 that includes a volatile memory 107 and a non-volatile memory 108. The context key 105 stored in the non-volatile memory 108 may be encrypted via a master key 109 that is not kept at the anchor unit 98 itself. The anchor unit 98 may further include a data key store 110, which may comprise a database of data keys that are encrypted by the context key 105. To enable secure communication with the user device 14, the anchor unit 98 may include a public/private key pair that is used to encrypt communications. The anchor unit 98 may store sensitive data (e.g., the decrypted context key 105) in volatile memory 107, the contents of which are lost when the anchor unit 98 is powered off. The anchor unit 98 may also be configured to destroy the contents of the volatile memory 107 if the connection to the initiation unit 100 is lost, e.g., if the anchor unit 98 is removed from its hardened location.

The initiation unit 100 may be a hardened unit that keeps the master key 109. In an embodiment of the invention, the master key 109 never leaves the initiation unit 100. The initiation unit 100 may communicate with the anchor unit 98 only once per reboot, may maintain an initiation public/private key pair to achieve secure communication, and may be in close proximity to the anchor unit 98, e.g., in the same data center. The initiation unit 100 may also be provided as a cloud-based service.

The user 12 may access data via the user device 14, which includes a local memory for storing data. The access control layer 50 may be provided by a software module or application installed in each user device 14. The access control layer 50 may be a software agent that filters interaction between user applications on the user device 14 and the local memory, network ports, or any other sources of sensitive data. The access control layer 50 may include a public/private key pair for secure communication. The data store 104 may maintain and provide access to data from a database or a cloud storage. The data store 104 may also maintain metadata and context information associated with the sensitive data.

The above described services may be provided over multiple units to provide redundancies for the services and units. This may enable the data anchor system to maintain continuity of service in case, at any given point in time, one of the units is out of service. In this case, the access control layer 50 may switch to the alternate service automatically.

To initiate the anchor service 26 when the system is booted up for the first time, the anchor unit 98 may set up a secure connection with the initiation unit 100. All communication may be encrypted, and messages may be signed via the public/private key pair. The anchor unit 98 may transmit the encrypted context key to the initiation unit 100. In response to receiving the encrypted context key, the initiation unit 100 may transmit the decrypted context key 105 back to the anchor unit 98 over the secure channel along with a hashed version of the key. Initiation may be complete when the anchor unit 98 verifies the hash with respect to the decrypted context key 105 and the signature of the initiation unit 100 is verified.

The router 96 (e.g., a wireless router running an IEEE 802.11-based protocol) or a LAN (e.g., a wireless LAN) may be utilized to provide the heartbeat service 28. The access control layer 50 may initiate a separate connection with the network by transmitting a heartbeat generation signal 112 (e.g., a data packet) to the monitoring unit 94. The heartbeat generation signal 112 may be sent using a User Datagram Protocol (UDP), thereby avoiding the need for a transport-layer acknowledgement from the monitoring unit 94. The content of the heartbeat generation signal 112 may include a hash of the network access context data (e.g., Service Set Identity (SSID), Basic Service Set Identity (BSSID), etc.), as well as a physical location of the user device 14, if available. The heartbeat generation signal 112 may be broadcast periodically (e.g., once every 10 secs), and a link-level acknowledgement signal 114 received from the router 96 used as the heartbeat signal 40. As long as the heartbeat timeout period (e.g., 30 secs) has not expired, the access control layer 50 may allow files and data that are tied to the associated access context to be decrypted.

When an application requests data from a data source, the access control layer 50 may check the metadata for the access context. If the access context is checked and enabled, the access control layer 50 may obtain the file key or the key for the database column from the anchor unit 98 over a secure channel, which may be throttled appropriately as described above. In response to the heartbeat signal being lost, the access control layer 50 may delete the file keys and revoke access to the sensitive data.

Figure 8:
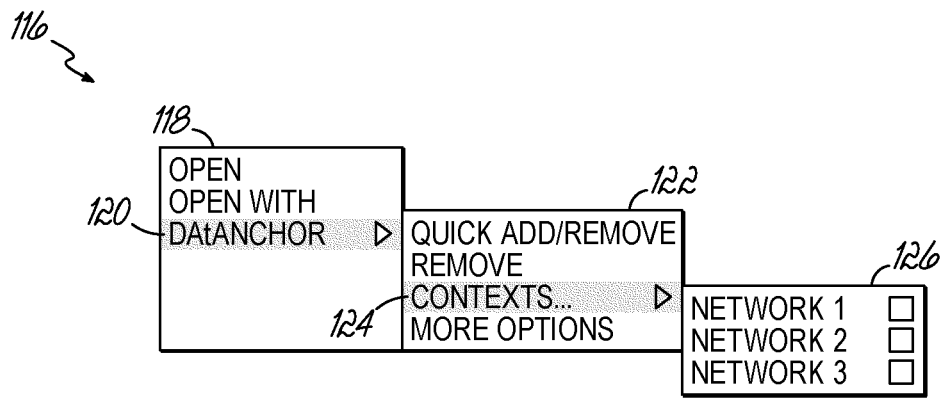
FIGS. 8 and 9 are diagrammatic views of a user interface that may be provided by the user device of FIGS. 1-3.
Figure 9:
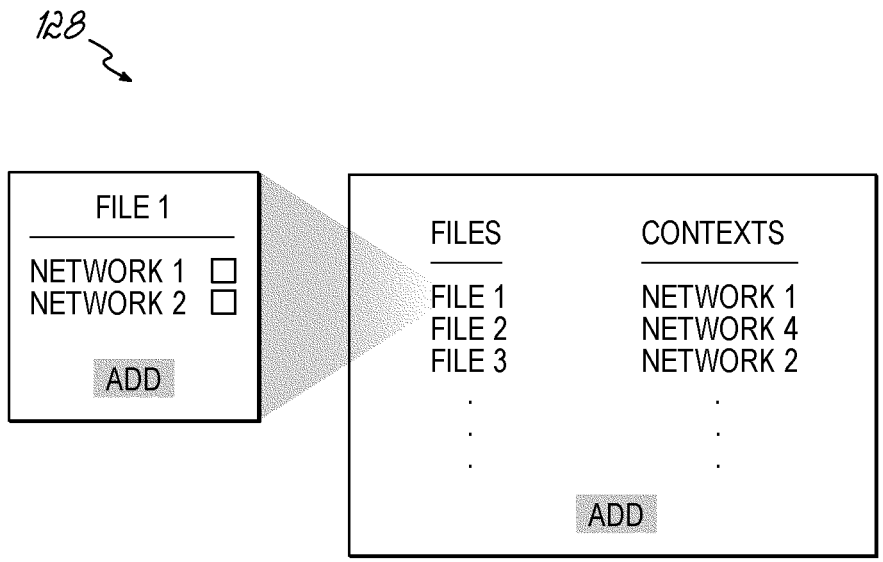

Referring now to FIGS. 8 and 9, a user interface 116 for creating and modifying access context may be seamlessly integrated into existing operating systems. For example, as depicted in FIG. 8, in response to detecting a right click on a directory or a file, the user interface 116 may display a menu 118 (e.g., a drop-down menu) of applications that includes a menu item 120 (e.g., labeled "DAtAnchor"). Hovering over the menu item 120 may cause another menu 122 to be displayed that allows the user to add or remove an access context. Hovering over a menu item 124 of menu 122 (e.g., labeled "Contexts") may cause another menu 126 to be displayed that lists available networks from which the user 12 can select a location context for the heartbeat signal 40. In response to the user 12 selecting a network, an associated password may be requested by the access control layer 50 so that the access control layer 50 can set up a connection with a router in that network. If the router has already been accessed by the access control layer 50, the password may not need to be reacquired by the access control layer 50.

FIG. 9 depicts a user interface 128 for managing access contexts associated with a file or data source. One constraint to manage access contexts associated with a file may be that the access control layer 50 should be connected to a valid access context and actively hearing the associated heartbeat. Any time a new access context is created, or an existing access context is modified, the access control layer 50 may transmit an update to the file store for the metadata associated with the data so that the metadata can be updated according to the change in the access context.

In operation, the context key 105 may be encrypted using the master key 109 and the encrypted context key stored in the non-volatile memory 108. Upon initiation, the anchor unit 98 may retrieve the encrypted context key and transmit the key to the initiation unit 100 for decryption. The decrypted context key 105 may be transmitted back to the anchor unit 98 and stored in the volatile memory 107. The unencrypted context key 105 may automatically be erased from the volatile memory 107 if the anchor unit 98 is powered off. The unencrypted context key 105 may also be erased if the anchor unit 98 loses its connection with the initiation unit 100.

In response to receiving a request from the access control layer 50, the anchor unit 98 may verify the authentication credentials for that user device 14. If the authentication credentials are valid, the anchor unit 98 may decrypt the requested file or database access key and transmit the decrypted key to the access control layer 50 of user device 14, e.g., using the WiFi connection. The anchor unit 98 may maintain a bucket of tokens for each active access control layer 50, and may throttle key unlock responses according to the available tokens for the associated user device 14.

Locating the data key store 110 in the anchor unit 98 can provide certain advantages. For example, if it is determined that all or part of the data keys are compromised, the data keys can be changed at the anchor unit 98 without a need to modify the data in the data store 104. The encryption process for the data keys may be a light process as the key lengths are typically no more than 256 Bytes in most secure storage systems.

The monitoring unit 94 may maintain a log of each file and user, and accept connections with appropriate credentials so that a system administrator can keep track of who is accessing the system. The monitoring unit 94 may also include both user and file-level monitoring with associated spatial and temporal information. The heartbeat signal 40 may contain updates on the access of a given user to associated files or databases within a heartbeat duration. Existing user tracking and attack detection tools may also be integrated in the monitoring unit 94.

Enterprises often work with external entities (e.g., vendors and partners) who use data from databases and file stores of the enterprise. To address this need, embodiments of the invention may offer an access portal through which external entities can access sensitive data. The access portal may also monitor and track access to sensitive data.

An external entity may initiate a data access session using a web-based interface at the user device 14, e.g., a web-browser. The access portal may require a login process once per session. In response to the user completing the login process, the access portal may initiate a session monitoring process. In an exemplary embodiment of the invention, the access portal may provide multiple levels of control (e.g., three levels) on the external entity's access to data. These levels may depend on choices made by the external entity.

One level, referred to herein as "plain monitoring", may provide a least restrictive access to data. In this level of access, the access control layer 50 may allow access to the data. However, for marked files or content, the access control layer 50 may transmit the context identifier provided by the heartbeat signal 40 to the monitoring unit 94 for purposes of tracking access to the data.

Another level, referred to herein as "single context", the access control layer 50 may go through the login process and grant access to data associated with the initiating access context based on the login. The heartbeat signal 40 may be provided directly from the monitoring unit 94 to the access control layer 50 via transport-layer acknowledgements, and the access control layer 50 may set up a Transmission Control Protocol (TCP) connection with the monitoring unit 94. If the heartbeat signal from monitoring unit 94 is lost, the access control layer 50 may delete the file keys and revoke access to data through the access portal.

The access portal may also operate in accordance with the description of the operating environment 92 depicted in FIG. 6. This version of the access portal may provide the enterprise and the external entities with data access control at the highest granularity.

Advantageously, embodiments of the invention may enable enforcement of encryption in a simple fashion that is seamless to the user. That is, both the user and application are typically unaware that they are interacting with the data anchor system. In contrast to conventional products that come in the form of macros integrated into specific applications, the universal nature of the data anchor system allows it to work seamlessly without regard to the application or data type. Further, the system user can also whitelist or blacklist applications effortlessly in a few seconds. This ability to work seamlessly with list-based security systems and other applications is facilitated by the data anchor system operating below the application layer rather than at the application layer or in the application itself.

More advantageously, the use of physical context and dynamic revocation can provide advantages over products that rely on manual revocation. For example, embodiments of the data anchor system that use contextual data access based on physical constraints (e.g., location or proximity) enables dynamic revocation of access to sensitive data by toggling the state of a user between accessible and revoked, depending on their proximity or connectivity to a context. This ability to dynamically control access may provide significant advantages over conventional systems lacking this feature. Once revoked, embodiments of the system remove any trace of plaintext from the RAM, caches, drive system. Embodiments of the system are also able to seamlessly integrate with cloud-based storage systems (e.g., Dropbox, Box, Egnyte, OneDrive, Google Drive) and most desktop data synchronization systems. This is in contrast to conventional systems which either fail to make sure that all versions stored in the cloud are encrypted, or only work with one specified cloud-based storage system. Advantageously, the data anchor system provides simple management and IT processes as compared to known systems such as Microsoft DLP/Azure IT for example, in which even simple operations (keeping data encrypted at end-user devices) require a significant effort from the IT department.

Figure 10:
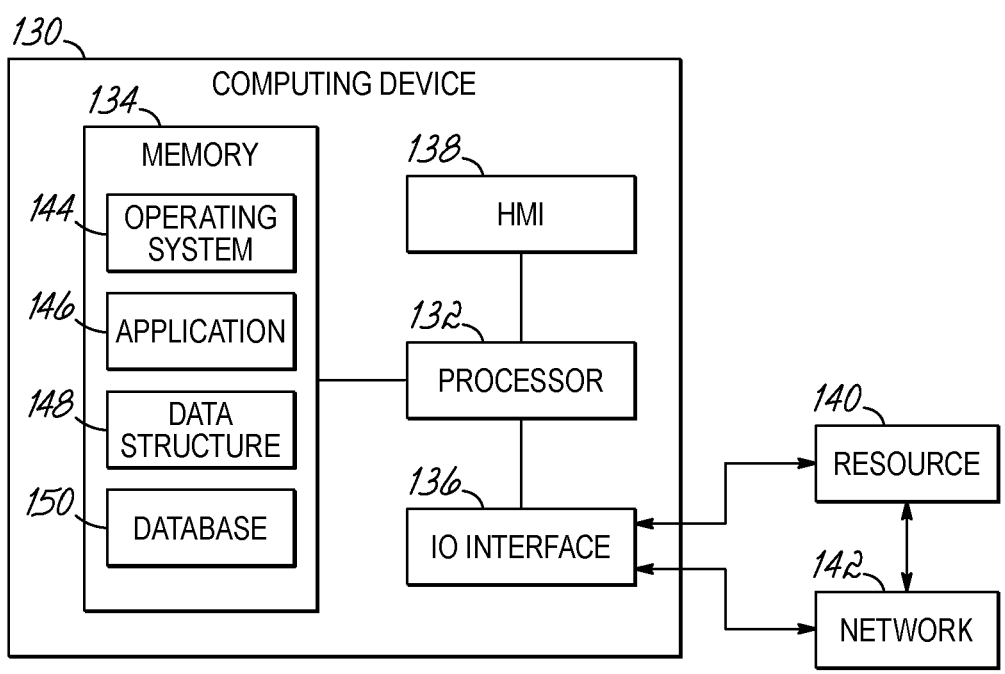
FIG. 10 is a diagrammatic view of a computer that may be used to provide one or more aspects of the embodiments of the invention depicted in FIGS. 1-9.

Referring now to FIG. 10, embodiments of the invention described above, or portions thereof, may be implemented using one or more computer devices or systems, such as exemplary computer 130. The computer 130 may include a processor 132, a memory 134, an I/O interface 136, and a Human Machine Interface (HMI) 138. The computer 130 may also be operatively coupled to one or more external resources 140 via the network 142 or I/O interface 136. External resources may include, but are not limited to, servers, databases, mass storage devices, peripheral devices, cloud-based network services, or any other resource that may be used by the computer 130.

The processor 132 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in memory 134. Memory 134 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or data storage devices such as a hard drive, optical drive, tape drive, volatile or non-volatile solid state device, or any other device capable of storing data.

The processor 132 may operate under the control of an operating system 144 that resides in memory 134. The operating system 144 may manage computer resources so that computer program code embodied as one or more computer software applications, such as an application 146 residing in memory 134, may have instructions executed by the processor 132. In an alternative embodiment, the processor 132 may execute the application 146 directly, in which case the operating system 144 may be omitted. One or more data structures 148 may also reside in memory 134, and may be used by the processor 132, operating system 144, or application 146 to store or manipulate data.

The I/O interface 136 may provide a machine interface that operatively couples the processor 132 to other devices and systems, such as the external resource 140 or the network 142. The application 146 may thereby work cooperatively with the external resource 140 or network 142 by communicating via the I/O interface 136 to provide the various features, functions, applications, processes, or modules comprising embodiments of the invention. The application 146 may also have program code that is executed by one or more external resources 140, or otherwise rely on functions or signals provided by other system or network components external to the computer 130. Indeed, given the nearly endless hardware and software configurations possible, persons having ordinary skill in the art will understand that embodiments of the invention may include applications that are located externally to the computer 130, distributed among multiple computers or other external resources 140, or provided by computing resources (hardware and software) that are provided as a service over the network 142, such as a cloud computing service.

The HMI 138 may be operatively coupled to the processor 132 of computer 130 to allow a user to interact directly with the computer 130. The HMI 138 may include video or alphanumeric displays, a touch screen, a speaker, and any other suitable audio and visual indicators capable of providing data to the user. The HMI 138 may also include input devices and controls such as an alphanumeric keyboard, a pointing device, keypads, pushbuttons, control knobs, microphones, etc., capable of accepting commands or input from the user and transmitting the entered input to the processor 132.

A database 150 may reside in memory 134, and may be used to collect and organize data used by the various systems and modules described herein. The database 150 may include data and supporting data structures that store and organize the data. In particular, the database 150 may be arranged with any database organization or structure including, but not limited to, a relational database, a hierarchical database, a network database, or combinations thereof. A database management system in the form of a computer software application executing as instructions on the processor 132 may be used to access the information or data stored in records of the database 150 in response to a query, where a query may be dynamically determined and executed by the operating system 144, other applications 146, or one or more modules.

In general, the routines executed to implement the embodiments of the invention, whether implemented as part of an operating system or a specific application, component, program, object, module or sequence of instructions, or a subset thereof, may be referred to herein as "computer program code," or simply "program code." Program code typically comprises computer-readable instructions that are resident at various times in various memory and storage devices in a computer and that, when read and executed by one or more processors in a computer, cause that computer to perform the operations necessary to execute operations or elements embodying the various aspects of the embodiments of the invention. Computer-readable program instructions for carrying out operations of the embodiments of the invention may be, for example, assembly language, source code, or object code written in any combination of one or more programming languages.

Various program code described herein may be identified based upon the application within which it is implemented in specific embodiments of the invention. However, it should be appreciated that any particular program nomenclature which follows is used merely for convenience, and thus the invention should not be limited to use solely in any specific application identified or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications or modules described herein is capable of being individually or collectively distributed as a program product in a variety of different forms. In particular, the program code may be distributed using a computer-readable storage medium having computer-readable program instructions thereon for causing a processor to carry out aspects of the embodiments of the invention.

Computer-readable storage media, which is inherently non-transitory, may include volatile and non-volatile, and removable and non-removable tangible media implemented in any method or technology for storage of data, such as computer-readable instructions, data structures, program modules, or other data. Computer-readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store data and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatuses, or other devices to function in a particular manner, such that the instructions stored in the computer-readable medium produce an article of manufacture including instructions that implement the functions, acts, or operations specified in the flow-charts, sequence diagrams, or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, or operations specified in the flow-charts, sequence diagrams, or block diagrams.

In certain alternative embodiments, the functions, acts, or operations specified in the flow-charts, sequence diagrams, or block diagrams may be re-ordered, processed serially, or processed concurrently consistent with embodiments of the invention. Moreover, any of the flow-charts, sequence diagrams, or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include both the singular and plural forms, and the term "or" is intended to include both alternative and conjunctive combinations, unless the context clearly indicates otherwise. It will be further understood that the terms "comprises" or "comprising," when used in this specification, specify the presence of stated features, integers, actions, steps, operations, elements, or components, but do not preclude the presence or addition of one or more other features, integers, actions, steps, operations, elements, components, or groups thereof. Furthermore, to the extent that the terms "includes", "having", "has", "with", "comprised of", or variants thereof are used in either the detailed description or the claims, such terms are intended to be inclusive in a manner similar to the term "comprising".

While all the invention has been illustrated by a description of various embodiments, and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A method of protecting data, comprising:
   transmitting a heartbeat signal that conveys a context identifier;
   receiving a request from a user device, the request including the context identifier;
   in response to the context identifier in the request matching the context identifier conveyed by the heartbeat signal, unlocking encrypted data;
   in response to the context identifier in the request not matching the context identifier conveyed by the heartbeat signal, not unlocking the encrypted data;
   determining if the user device transmitting the request has exceeded an access control criteria threshold; and
   in response to the access control criteria threshold being exceeded, reducing a rate at which encryption keys are provided to the user device.

2. The method of claim 1 wherein unlocking the encrypted data comprises transmitting an encryption key to the user device, and the encrypted data is unlocked at the user device.

3. The method of claim 2 wherein the user device includes a memory, and further comprising:
   using the encryption key to generate plaintext from the encrypted data;
   storing the plaintext in the memory of the user device; and
   in response to the user device failing to receive the heartbeat signal, removing the encryption key and the plaintext from the memory of the user device.

4. The method of claim 2 wherein the request is a key-unlock request, and the encryption key is a context key for unlocking an encrypted data key.

5. The method of claim 4 wherein the user device uses the context key to unlock the encrypted data key, and uses the data key to unlock the data.

6. The method of claim 4 wherein the encrypted data key is stored in metadata of the data, and the data is encrypted by the data key.

7. The method of claim 2 wherein not unlocking the encrypted data comprises withholding the encryption key from the user device.

8. The method of claim 2 wherein the user device includes an application, and further comprising:
   using the encryption key to generate plaintext from the encrypted data;
   modifying the plaintext using the application; and
   encrypting the modified plaintext using the encryption key.

9. The method of claim 1 wherein the rate at which encryption keys are provided to the user device is controlled by at least one of one or more service curves, a leaky bucket algorithm, or by delaying transmission of a response to the request.

10. The method of claim 1 wherein the access control criteria threshold is an amount of encrypted data, a number of encrypted files, or a transmission rate quota.

11. The method of claim 1 wherein the heartbeat signal is transmitted from a wireless unit, and the heartbeat signal is received only by the user device if the user device is in proximity to the wireless unit.

12. The method of claim 11 wherein the wireless unit is a wireless router, an Internet of Things device, or a smart phone.

13. The method of claim 1 wherein the request includes the encrypted data, and further comprising:
  transmitting plaintext of the encrypted data to the user device in a response to the request.

14. A system for protecting data, comprising:
  one or more processors; and
  a memory coupled to the one or more processors and containing program code that, when executed by at least one of the one or more processors, causes the system to:
  transmit a heartbeat signal that conveys a context identifier;
  receive a request from a user device, the request including the context identifier;
  in response to the context identifier in the request matching the context identifier conveyed by the heartbeat signal, unlock encrypted data;
  in response to the context identifier in the request not matching the context identifier conveyed by the heartbeat signal, not unlock the encrypted data;
  determine if the user device transmitting the request has exceeded an access control criteria threshold; and
  in response to the access control criteria threshold being exceeded, reduce a rate at which encryption keys are provided to the user device.

15. The system of claim 14 wherein unlocking the encrypted data comprises transmitting an encryption key to the user device, and the encrypted data is unlocked at the user device.

16. The system of claim 15 wherein the program code further causes the system to:
  use the encryption key to generate plaintext from the encrypted data;
  store the plaintext in the user device; and
  in response to the user device failing to receive the heartbeat signal, remove the encryption key and the plaintext from the user device.

17. The system of claim 15 wherein the request is a key-unlock request, and the encryption key is a context key for unlocking an encrypted data key.

18. A computer program product for securing data, comprising:
  a non-transitory computer readable storage medium containing program code that, when executed by one or more processors, causes the one or more processors to:
  transmit a heartbeat signal that conveys a context identifier;
  receive a request from a user device, the request including the context identifier;
  in response to the context identifier in the request matching the context identifier conveyed by the heartbeat signal, unlock encrypted data;
  in response to the context identifier in the request not matching the context identifier conveyed by the heartbeat signal, not unlock the encrypted data;
  determine if the user device transmitting the request has exceeded an access control criteria threshold; and
  in response to the access control criteria threshold being exceeded, reduce a rate at which encryption keys are provided to the user device.

* * * * *